(12) United States Patent
Woodson, Jr et al.

(10) Patent No.: US 6,310,121 B1
(45) Date of Patent: Oct. 30, 2001

(54) POLYMERIC COMPOSITES INCLUDING DICYCLOPENTADIENE AND RELATED MONOMERS

(75) Inventors: Charles S. Woodson, Jr, Conroe, TX (US); Robert H. Grubbs, South Pasadena, CA (US)

(73) Assignee: Cymetech, LLC, Huntsville, TX (US)

( * ) Notice: Subject to any disclaimer, the term of this patent is extended or adjusted under 35 U.S.C. 154(b) by 0 days.

(21) Appl. No.: 09/130,586

(22) Filed: Aug. 7, 1998

Related U.S. Application Data

(63) Continuation-in-part of application No. 08/759,018, filed on Dec. 2, 1996, now Pat. No. 5,939,504.

(51) Int. Cl.$^7$ ................... C08J 5/04; C08F 4/80
(52) U.S. Cl. ................... 524/32; 524/35; 524/80; 526/145; 526/146; 526/147; 526/171; 526/281; 526/283; 502/152; 502/155; 502/156; 556/22; 556/136
(58) Field of Search ................... 526/145, 171, 526/283, 281, 146, 147; 502/152, 162, 155, 156; 524/32, 35, 80; 556/22, 136

(56) References Cited

U.S. PATENT DOCUMENTS

| | | | |
|---|---|---|---|
| 4,507,453 | 3/1985 | Tom | 526/283 |
| 4,520,181 | 5/1985 | Klosiewicz | 525/247 |
| 4,661,575 | 4/1987 | Tom | 526/283 |
| 4,703,098 | 10/1987 | Matlack | 526/283 |
| 4,899,005 | 2/1990 | Lane et al. | 585/360 |
| 4,906,797 | 3/1990 | Lane et al. | 585/1 |
| 5,312,940 | * 5/1994 | Grubbs et al. | 556/131 |
| 5,710,298 | 1/1998 | Grubbs et al. | 556/22 |
| 5,831,108 | 11/1998 | Grubbs et al. | 556/21 |

FOREIGN PATENT DOCUMENTS

WO 97/14738 * 4/1997 (WO).

OTHER PUBLICATIONS

Burrell, Anthony, et al., "Synthesis and Reactions of Ru(=CH$_2$)Cl(NO)(PPh$_3$)$_2$, a Stable Terminal Methylene Complex and the Crystal Structure of Ru(CH$_2$PPh$_3$)($\eta^2$–C$_2$F$_4$)Cl(NO)(PPh$_3$)†", *J. Chem. Soc. Dalton Trans.*, pp. 609–614 (1991).

* cited by examiner

*Primary Examiner*—David W. Wu
*Assistant Examiner*—R. Harlan

(57) ABSTRACT

Compositions including fibers, fillers, reinforcing agents or other property-enhancing agents added to a polymeric matrix formed from DCPD monomer or related compounds such as norbornene and norbornadiene are disclosed. The composition has a mechanically forgiving matrix due to the polymer with the inherent strength and other physical properties of the enhancement agent according to the invention. Enhancement agents according to the invention generally include inorganic, organic and metallic substances in a variety of forms.

20 Claims, No Drawings

POLYMERIC COMPOSITES INCLUDING DICYCLOPENTADIENE AND RELATED MONOMERS

CROSS REFERENCE TO RELATED APPLICATIONS

This application is a continuation-in-part of U.S. application Ser. No. 08/759,018, filed Dec. 2, 1996, now U.S. Pat. No. 5,939,504.

BACKGROUND

1. Field of the Invention

The present invention relates to compositions and methods for catalyzing and controlling the rate of olefin metathesis reactions. More particularly, the present invention relates to compositions and methods for catalyzing and controlling the rate of Ring Opening Metathesis Polymerization (ROMP) reactions and the molding of polymer articles using polymers formed by ROMP. The polymer articles can include enhancement agents such as fillers, fibers, and other substances that can improve physical or other properties of the article.

2. Description of the Related Art

The molding of thermoset polymers is a technologically important processing technique. In one version of this technique, a liquid monomer (e.g., an olefin) and a polymerization catalyst are mixed and poured, cast or injected into a mold. The polymerization proceeds (the article "cures") and on completion the molded part is removed from the mold for any post cure processing that is required. The polymerization reaction mixture may optionally contain added modifiers, fillers, reinforcements, pigments, etc.

To mold successfully, the reaction mixture must not cure so quickly that the liquid monomer/catalyst mixture polymerizes before the mixture can be introduced in to the mold. In addition, the mixture must not cure so quickly that it polymerizes before the mold is completely filled or before the catalyst has had time to completely dissolve. For convenience and expedient cycle time, it is also important that the catalyst activate within a reasonable time after the mold is filled.

The time during which the liquid monomer/catalyst mixture can be worked after the monomer and catalyst is mixed is called the "pot life" of the polymerization reaction mixture. The ability to control the "pot life" becomes even more important in the molding of large parts. The monomer/catalyst mixture may also be applied to articles as a coating, and in this case it is also important to be able to control the "pot life" of the mixture. Generally, it would be useful to be able to control the rate of reaction of catalyzed metathesis reactions including ROMP reactions.

Reaction Injection Molding ("RIM") has previously been used for the molding of polymer articles using a polymerization catalyst and olefin monomer (U.S. Pat. Nos. 4,400,340 and 4,943,621). In these previous processes, a metal (W or Mo) containing compound is dissolved in a first monomer stream and an alkyl aluminum compound is dissolved in a second monomer stream. The monomer streams are then mixed and the metal containing compound and the alkyl aluminum compound react to form an active catalyst which then catalyzes the polymerization reaction. In the previous processes, the alkyl aluminum compound stream may also include an inhibitor, usually a Lewis base, which inhibits the rate of formation of the catalyst; however, in these previous processes, once the catalyst is formed, the polymerization reaction is extremely fast and there is no method to control "limited methods" the rate of polymerization initiated by the active catalyst species.

Previously, there has been few methods for producing a mixture of active catalyst species and monomer and controlling the rate of polymerization of the mixture other than by controlling the temperature of the monomer or the mold. Such control would be useful, for example, to produce a catalyst/monomer mixture in which the catalyst is substantially deactivated at room temperature. This mixture may then be poured, cast, or injected into a mold and the polymerization may then be initiated by heating the mixture.

There therefore exists a need for an olefin metathesis catalyst system that can be used to catalyze olefin metathesis reactions and control the rate of the catalyzed metathesis reaction. There is also a need for an olefin metathesis catalyst system that can be used to control the pot life of a monomer/catalyst mixture in a ROMP reaction.

Many mechanical structures would advantageously be formed from a material exhibiting, for example, the mechanical toughness of thermoplastics, the high heat distortion temperature and high flex modulus of thermosetting plastics, in addition to having excellent chemical inertness or corrosion resistance. In particular, it would be desirable to have a material that is tough but mechanically forgiving, for example, a material that will "give" to some degree without cracking or other failure.

It is known to modify the properties of a conventional epoxy or polyester, which typically produce somewhat brittle materials, with plasticizers or elastomers to enhance toughness, but these additives typically also degrade corrosion resistance and other properties of the polymer material. Likewise, these or similar additives may be unsuitable or unavailable for DCPD or related monomers.

SUMMARY

The present invention addresses these needs by providing a composition which may be used for catalyzing and controlling the rate of olefin metathesis reactions. The invention also provides a method for controlling an olefin metathesis reaction using the composition, a process for Ring Opening Metathesis Polymerization using the composition, and a method for molding polymer articles using ROMP catalyzed and controlled by the composition.

In one embodiment of the invention, the composition includes a Ruthenium or Osmium carbene complex catalyst and a gel modification additive. The Ruthenium or Osmium carbene complex catalyst includes a Ruthenium or Osmium metal center that is in a +2 oxidation state, has an electron count of 16, and is pentacoordinated and the gel modification additive is an electron donor or Lewis base. More specifically, the Ruthenium or Osmium carbene complex catalyst may have the formula

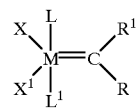

where M may be Os or Ru; R and $R^1$ may be the same or different and may be hydrogen or a substituent group including $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl; X and $X^1$ may be the same or different and may be any anionic ligand; and L and $L^1$ may be the same or different and may be neutral electron donor. The substituent groups may be substituted with one or more groups including $C_1$–$C_5$ alkyl, halide, $C_1$–$C_5$ alkoxy, and phenyl. The phenyl group may be substituted with one or more groups including halide, $C_1$–$C_5$ alkyl and $C_1$–$C_5$ alkoxy. In addition to the above groups, the substituent group may be substituted with one or more functional groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen. In a preferred embodiment, the R and $R^1$ groups may be the same or different and may be hydrogen, substituted aryl, unsubstituted aryl, substituted vinyl, and unsubstituted vinyl; where the substituted aryl and substituted vinyl may be substituted with one or more groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, halogen, $C_1$–$C_5$ alkyl, $C_1$–$C_5$ alkoxy, unsubstituted phenyl, and phenyl substituted with a halide, $C_1$–$C_5$ alkyl or $C_1$–$C_5$ alkoxy.

In a preferred embodiment, the gel modification additive is a neutral electron donor or a neutral Lewis base. The gel modification additive may be a phosphine, sulfonates phosphine, phosphite, phosphinite, phosphonite, arsine, stibine, ether, amine, amide, sulfoxide, carboxyl, nitrosyl, pyridine, or thioether. More specifically, the gel modification additive may be a trialkylphosphine or triarylphosphine. Preferred gel modification additives include P(cyclohexyl)$_3$, P(cyclopentyl)$_3$, P(isopropyl)$_3$, P(phenyl)$_3$, and pyridine.

In a preferred embodiment of the invention, the composition includes a catalyst of the formula

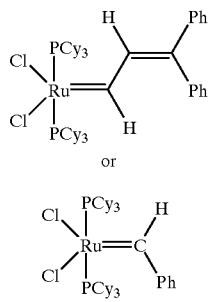

where Cy is cyclohexyl or cyclopentyl, and a gel modification additive having the formula P(Phenyl)$_3$.

In another embodiment of the invention the composition includes a catalyst of the formula

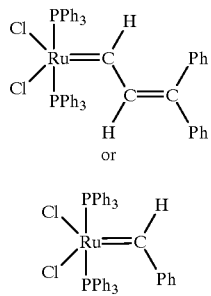

and a gel modification additive of the formula P(cyclohexyl)$_3$ or P(cyclopentyl)$_3$.

The invention also includes a method for olefin metathesis which includes the step of contacting an olefin with a composition according to the present invention. The olefin may be unfunctionalized or functionalized to contain one or more functional groups selected from the group consisting of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. The olefin may be a strained cyclic olefin, unstrained cyclic olefin, acyclic olefin, diene, or unsaturated polymer; each of which may be functionalized or unfunctionalized.

The invention also includes a process for the ring opening metathesis polymerization of functionalized or unlfunctionalized cyclic olefins. This process includes contacting a functionalized or unfunctionalized cyclic olefin with a composition according to the present invention. The cyclic olefins may be strained or unstrained and may be monocyclic, bicyclic, or multicyclic olefins. If the cyclic olefin is functionalized, it may contain one or more functional groups including of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. In a preferred embodiment, the cyclic olefin is cyclobutene, cycloheptene, cyclooctene, cyclononene, cyclodecene, cyclooctadiene, cyclononadiene, norbornene and dicyclopentadiene; each of which may be functionalized or unfunctionalized. In a more preferred embodiment, the cyclic olefin is dicyclopentadiene.

The invention also includes a process for molding polymer articles in which a mixture comprising a functionalized or unfunctionalized cyclic olefin and a composition according to the present invention is provided in a mold. The mixture may either be prepared in the mold or prepared outside of the mold and then introduced into the mold. The mixture is then left to at least partially polymerize to form a polymer article and the polymer article is removed from the mold. Alternatively, the mixture may be coated onto an article and left to at least partially polymerize to form a coating. The mixture may be made by preparing a mixture of monomer and gel modification additive and adding the catalyst. The process may also include heating the mold and heating the mixture. The process may also include adding a crosslinking initiator to the mixture. If the cyclic olefin is functionalized, it may contain one or more functional groups including of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. In a preferred embodiment, the cyclic olefin is cyclobutene, cycloheptene, cyclooctene, cyclononene, cyclodecene, cyclooctadiene, cyclononadiene, norbornene and dicyclopentadiene; each of which may be functionalized or unfunctionalized. In a more preferred embodiment, the cyclic olefin is dicyclopentadiene.

The invention also includes a method for controlling the rate of an olefin metathesis reaction that is catalyzed by a metathesis catalyst having an open coordination site. This method includes the step of contacting an active catalyst having an open coordination site with an olefin in the presence of a means for coordinating the catalyst open coordination site. The means may be an electron donor or Lewis base.

The invention also generally relates to a composition including fibers, fillers, reinforcing agents or other property-enhancing additives in a polymeric matrix formed from DCPD monomer or related compounds such as norbornene and norbornadiene. The composition has a mechanically forgiving matrix due to the polymer matrix with the inherent strength and other physical properties of the added enhancement agent according to the invention.

DETAILED DESCRIPTION POLYMERIC COMPOSITES INCLUDING ENHANCEMENT AGENTS

Polyermic composites according to the invention can include enhancement agents, which agents are generally substances that are mixed with a monomer before polymerization to enhance the bulk properties of the composite. The enhancement agents are added in sufficient quantity so that they do not interfere with polymerization or molding yet enhance at least one bulk property of the composite product. For example, it may be desired to increase the strength of the composite or to reduce its brittleness.

Another desirable outcome for a composite according to the invention is reduced shrinkage. In particular, as part of the composition of the invention, an enhancement agent according to the invention can reduce embrittlement caused by ozone attack or oxidation of susceptible sites on the monomer or polymeric composite. Since the amount of monomer or polymer exposed on the surface is relatively reduced by the inclusion of an enhancement agent, embrittlement resulting by this surface attack is reduced, even while improving other physical properties.

Monomers suitable for compositions according to the present invention include those polymerizable by a ring-opening metathesis polymerization using the catalysts described herein or other catalysts. Suitable monomers include cyclic olefins such as DCPD and related monomers such as norbornene, cyclobutene, cyclopentene, cycloheptene, cyclooctene, cyclononene, cyclodecene, cyclooctadiene, cyclononadiene, cyclododecene, norbornene, 7-oxanorbornene, norbornadiene, 7-oxanorbornadiene, each of which may be functionalized or unfunctionalized. In a more preferred embodiment, the cyclic olefin is dicyclopentadiene.

Ruthenium and osmium carbene complex catalysts that may be used in the present invention and methods of synthesizing these catalysts are taught in this specification and the following patent documents, all of which are incorporated herein by reference: U.S. Pat. Nos. 5,312,940 and 5,342,909; U.S. patent application Ser. No. 08/282,827 (filed Jul. 29, 1994), Ser. No. 08/282,826 (filed Jul. 29, 1994), Ser. No. 08/693,789 (filed Jul. 31, 1996), Ser. No. 08/862,615 (filed May 23, 1997), Ser. No. 08/708,057 (filed Aug. 30, 1996) and Ser. No. 08/966,011 (filed Nov. 11, 1997); and U.S. provisional patent application 60/031,088, filed Nov. 15, 1996.

An exemplary composition according this invention including commercially available carbon fibers are described in the following illustrations.

650 grams of VELSICOL VHP (99+% DCPD) is mixed with a ruthenium or osmium metal carbene complex catalyst (as described in U.S. Pat. Nos. 5,342,909 and 5,312,940 and pending application Ser. Nos. 08/765,865, 08/282,827, 081705,064, 08/693,789, 08/708,057, 08/863,615, and 08/966,011, each of which is incorporated herein by reference) in a 7500:1 monomer to catalyst ratio with 0.040 grams of a triphenylphosphine per 64 grams of monomer. The mixture is mixed for 1 minute and then poured into 5 different molds. After drying to drive off water, each of 4 different carbon fibers and Kevlar (aromatic) (listed in Table 1 below) was added to each of the 5 samples and allowed to gel. Post cure was about 130° C. for one hour.

TABLE 1

| | Carbon fibers | |
|---|---|---|
| Sample | Commercial Designation for Carbon Fiber | Commercial Source |
| 1 | Type IM 7G | Hercules |
| 2 | Type IM 7GP | Hercules |
| 3 | Type ASH W | Hercules |
| 4 | Type IM 7W | Hercules |
| 5 | KEVLAR Type 32 | DuPont |

From visual observation, each of the samples appeared to polymerize; i.e., the carbon fibers did not appear to inhibit polymerization of the DCPD matrix.

The resulting composite materials had high tensile strength, yet each was mechanically forgiving. These properties are apparently due to the combination of the reinforcement provided by the carbon fibers with the plastic properties of the poly-DCPD matrix.

Composites according to the invention are especially suitable for applications requiring high impact resistance. In addition, since the monomer did polymerize around the fibers, it would protect the enhancement agent from deleterious environments (e.g., from corrosive attack) in the vicinity of the part for which the material according to the invention was used. Other enhancement agents according to the invention can be added to a suitable monomer and processed analogously to produce composite materials with enhanced properties.

Exemplary inorganic and organic enhancement agents according to the invention are listed in Table 2. The enhancement agents of the invention are classified for convenience using conventional or illustrative categories of fillers (e.g., inorganic, organic and metallic), fibers and reinforcements; however, physical forms other than those listed may be useful. Metallic enhancement agents according to the invention are those that are compatible with the composite composition and do not interfere with the catalytic polymerization of the monomer. Exemplary metals that can be used to fill a DCPD-based composite are silver, gold, aluminum, tin and copper. Two or more enhancement agents according to the invention may be added to a mixture with the monomer and the catalyst.

TABLE 2

| Exemplary Enhancing Agents for Poly-DCPD and Related Compounds | | |
|---|---|---|
| Fillers | | |
| Inorganic | Organic | Metallic |
| minerals | carbon | wire |
| glass (e.g., flakes, spheres) | cotton | mesh |
| talc | wool | whiskers |
| barium | aramid | strands |
| calcium carbonate | polyvinyl | wool |
| calcium sulfate | polyvinylidene chloride | |
| clays | phenolics | |
| hydrated alumina | polyacrylonitrile (PAN) | |
| mica | cork | |
| perlite | α-cellulose | |

TABLE 2-continued

Exemplary Enhancing Agents for Poly-DCPD and Related Compounds

| | |
|---|---|
| quartz | thermoplastics (e.g., polyolefins, fluoropolymers, especially PTFE) |
| silica | elastomer- toughened monomers |
| wollastonite | |

Fibers mineral
glass (with or without sizing, such as chromic or VOLAN-type sizing)
carbon (e.g., vapor grown carbon fibers)

Reinforcements

| mica | yarns | fabric | woven roving |
|---|---|---|---|
| mat | continuous strand (e.g., glass, carbon, synthetic fiber) | | |

Compositions and Methods for Catalyzing and Controlling the Rate of Olefin Metathesis We have found that it is possible to control the rate of olefin metathesis reactions that are catalyzed by certain Ruthenium and Osmium carbene complex catalysts. More generally, we have found that it is possible to control the rate of polymerization in those reactions in which the polymerization mechanism involves an open coordination site at a catalyst metal center.

In one embodiment of the invention, olefin metathesis reactions are catalyzed and the rate of reaction is controlled by a composition that includes a Ruthenium or Osmium carbene complex catalyst as described above and a gel modification additive. We have chosen to name this second component a "Gel Modification Additive" because in certain reactions this component modifies the time in which the catalyst/monomer mixture gels, i.e. the time in which the mixture partially polymerizes. Generally however, by "Gel Modification Additive" we mean any substance that cooperates with the catalyst to change the rate of the catalyzed reaction. Most generally, we have found that the gel modification additive may be any electron donor or Lewis base.

The Ruthenium or Osmium carbene complex catalyst and gel modification additive composition may be used to catalyze and control the rate of reaction in a variety of olefin metathesis reactions. Examples of olefin metathesis reactions that may be catalyzed include Ring Opening Metathesis Polymerization of strained and unstrained cyclic olefins, Ring Closing Metathesis, cross- and self-metathesis of acyclic olefins, telechelic polymerization, and depolymerization of unsaturated polymers. These metathesis reactions are described in the following U.S. patent applications, all of which are incorporated herein by reference: Applications Ser. No. 08/550,679 (filed Oct. 31, 1995); Ser. No. 08/548,915 (filed Oct. 26, 1995); Ser. No. 08/548,445 (filed Oct. 26, 1995); Ser. No. 08/550,300 (filed Oct. 30, 1995), and 08/705,064 (filed Aug. 29, 1996).

The Ruthenium and Osmium carbene complex catalysts of the present invention are stable in the presence of a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. Since the catalysts are stable in the presence of these groups, the olefin substrate, the gel modification additive, and any substituent groups on the catalyst may include one or more of the above listed groups without deactivating the catalysts.

Preferred catalysts for polymerization of DCPD and related monomers as described here are of the general structure:

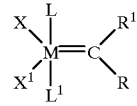

where M is Ru; $R^1$ is hydrogen; R is substituted or unsubstituted aryl or substituted or unsubstituted vinyl; X and $X^1$ are Cl; and L and $L^1$ are triphenylphosphines or tricycloalkylphosphines such as tricyclopentylphosphine and tricyclohexylphosphine. The substituted aryl and substituted vinyl may each be substituted with one or more groups including $C_1$–$C_5$ alkyl, halide, $C_1$–$C_5$ alkoxy, and a phenyl group which may be optionally substituted with one or more halide, $C_1$–$C_5$ alkyl, or $C_1$–$C_5$ alkoxy groups. The substituted aryl and substituted vinyl may also be substituted with one or more functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. The preferred gel modification additives are neutral electron donors such as phosphines. A particularly preferred embodiment of the present invention includes the ruthenium catalyst where L and $L^1$ are both tricyclopentylphosphine and the gel modification additive is triphenylphosphine ($PPh_3$).

Other catalysts known in the art may be needed for polymerizing monomers other than DCPD.

Gel Modification Additive

The rate of metathesis reaction may be controlled by varying the amount of gel modification additive (see Table 3) and the gel modification additive itself (see Table 5). As is conventional, the metathesis reaction rate may also be controlled by varying the reaction temperature. Gel modification additives that may be used in the present invention include phosphines, sulfonated phosphines, phosphites, phosphinites, phosphonites, arsines, stibines, ethers, amines, amides, sulfoxides, carboxyls, nitrosyls, pyridines, thioethers, nitriles, thiophenes, and furans. Specific gel modification additives include tricyclopentylphosphine, tricyclohexylphosphine, triphenylphosphite, pyridine, propylamine, tributylphosphine, benzonitrile, triphenylarsine, anhydrous acetonitrile, thiophene, and furan. Preferred gel modification additives include tricyclopentylphosphine, tricyclohexylphosphine, triisopropylphosphine, triphenylphosphine, and pyridine.

Without being bound by theory, we hypothesize that the gel modification additive operates by modifying the coordination environment of the catalyst. The gel modification additives of the present invention may be used to either enhance or reduce the rate of polymerization. The specific action of the gel modification additive will depend on both the additive used and the catalyst. The magnitude of the reduction or enhancement of the reaction will also depend on the concentration of the gel modification additive. Below we describe how to select a gel modification additive to achieve a specific desired action.

Triphenylphosphine is an example of a gel modification additive that acts to retard the rate of reaction when the catalyst has tricycloalkylphosphine L and $L^1$ ligands. In this case, the catalyst where L and L¹ are tricycloalkylphosphines is much more active in ROMP than the catalyst where L and L¹ are triphenylphosphines. When L and L¹ are tricycloalkylphosphines and the gel modification additive is triphenylphosphine, we therefore hypothesize that the added triphenylphosphine substitutes for the tricycloalkylphosphine in the coordination sphere of the ruthenium and decreases the activity of the catalyst. Generally, a gel modification additive decreases the rate of reaction if the catalyst becomes less active when its L and L¹ ligands are exchanged with the gel modification additive. Since monomer coordination is required for polymerization, the gel modification additive can also slow the polymerization reaction by competing with the monomer for coordination sites on the metal center. Hence, increasing the concentration of the gel modification additive will decrease the rate of polymerization reaction (See Table 5, samples 13–17).

Conversely, if the pot life (reaction time) is too long, as may be the case if a catalyst in which L and L¹ are triphenylphosphine is used, the pot life can be decreased (i.e., the reaction rate increased) by adding a gel modification additive such as tricyclohexylphosphine or tricyclopentylphosphine (see Table 5, samples 29–31). In this case, we hypothesize that the tricycloalkylphosphine gel modification additive exchanges with the triphenylphosphine L and L¹ ligands leading to a more active catalyst. Generally, a gel modification additive increases the rate of reaction if the catalyst becomes more active when its L and L¹ ligands are exchanged with the gel modification additive. However in this case, as the concentration of gel modification additive is increased, the additive will compete with the monomer for coordination sites on the metal center and the additive may eventually act to decrease the rate of reaction.

For the change in ligand and ligand structure to affect the overall rate of reaction and the time between mixing and gel point, there must be sufficient time for the ligands and gel modification additive to totally equilibrate between being bound by the catalyst and being in solution in the monomer. In some cases, to obtain the maximum effect of a gel modification additive, it may be necessary to allow the gel modification additive and the catalyst complex to equilibrate in a non reactive solvent before the monomer is added. This is particularly important where exchange of the ligands and gel modification additive appears to be slow relative to the onset of polymerization such as cases where a very bulky gel modification additive such as tricyclohexylphosphine is being exchanged on to the catalyst complex. For an example of this, see the results for samples 30 and 33 in Table 5 below.

Since the gel modification additive is assumed to modify the coordination environment of the catalyst, we hypothesize that any substance capable of coordinating with the catalyst metal center will modify the rate of catalyzed reaction. This holds true not only for the specific Ruthenium and Osmium catalysts discussed above but also for any catalysts that initiate reaction through an open coordination site at a metal center. In the present invention, the gel modification additive may therefore be any species that is capable of coordinating with an open coordination site at a catalyst metal center. Examples of gel modification additives that may be used include electron donors, Lewis bases, and nucleophiles.

If it is desired to speed up the reaction after the gel modification additive has been used, one may increase the reaction and/or mold temperature. By adjusting the amount of gel modification additive and the temperature, the pot life can be varied to the desired time. The amount of the additive required to achieve the desired pot life may depend on the coordinating ability of the gel modification additive used and the resulting catalyst activity of the substituted catalyst. As is shown in Table 5, some Lewis basic gel modification additives such as phosphites and propylamine completely inhibit the catalyst while some gel modification additives such as triphenylarsine, nitriles, ethers and thiols have little effect on polymerization rate at the low levels explored. In addition to the phosphines examined, pyridine was unexpectedly effective in controlling pot life.

To help determine the dependence of the reaction rate on the amount of gel modification additive, we can turn to some recent studies on the mechanistic pathways by which the Ru and Os carbene catalysts operate. A scientific article titled "Well-defined Ruthenium Olefin Metathesis Catalysts: Mechanism and Activity" by Eric L. Dias, SonBinh T. Nguyen, and Robert H. Grubbs, summarizes the results of these studies and has recently been accepted for publication in the Journal of the American Chemical Society. This article is incorporated herein by reference. Among other things, these studies investigated the effect of adding phosphines on the rate of a Ring Closing Metathesis ("RCM") reaction catalyzed by ruthenium catalysts of the type used in the present invention. The mechanistic pathways for other metathesis reactions such as ROMP are not expected be much different than those for the RCM reactions. In these studies, the added phosphine was the same as the L and L¹ ligands on the catalyst and therefore, by the arguments presented above, the added phosphine can only act to reduce the reaction rate by competing with the monomer for the open coordination site. These studies did in fact find that the added phosphine reduced the reaction rate; they further determined that the reaction rate was the sum of a term independent of the concentration of the added phosphine and a term inversely proportional to the concentration of the added phosphine. Since we expect the mechanism for metathesis reactions in general (and ROMP in particular) to be similar to that for RCM, the dependence of metathesis reaction rate on concentration of gel modification additive is expected to be similar to that found in the above study, at least in the case where the gel modification additive retards the reaction. Therefore an estimate of the dependence of the ROMP rate of reaction on the gel modification additive concentration could be achieved by performing just two separate reactions at different additive concentrations. In practice one may wish to run additional reactions at different additive concentrations to determine the best fit for the reaction rate.

Romp of Dicyclopentadiene

ROMP reactions have been used in the formation of high polymers by the ring-opening of cyclic olefins. The reaction has been used effectively for Reaction Injection Molding of thermosets. For these systems, techniques have been developed for controlling the gel time of the polymer by controlling the rate of catalyst formation after the catalyst components are mixed. In the present invention, the ROMP catalysts are the ruthenium or osmium carbene complex catalysts described above. In contrast to catalysts used in earlier RIM and Resin Transfer Molding ("RTM") processes, these catalysts may be added to the monomer in the molding process in their "active" form. Also in contrast to the earlier RIM processes, the polymerization Tate of the active catalyst can be controlled by adding a gel modification additive according to the present invention.

ROMP of dicyclopentadiene ("DCPD") is catalyzed by the above described catalysts. Cross-linking of the resulting poly DCPD has been explored commercially. See for example U.S. patent application Ser. No. 08/678,397 (filed Jul. 2, 1996) which is incorporated herein by reference.

In one aspect of the invention, the pot life of the ROMP of DCPD is controlled by the addition of a gel modification additive to the reaction mixture. By adding the gel modification additive, the room temperature pot life of the polymerization mixture may be extended from about 1–9 minutes with no gel modification additive to greater than 2.5 hrs or more with the gel modification additive present.

The present invention provides numerous advantages, most importantly, the ability to control the gel time or pot life while still being able to completely polymerize the monomer in a short period of time. The present invention further provides the ability to completely stop the polymerization reaction through decreasing the temperature of a catalyst concentrate (i.e., a concentrated mixture of the catalyst and gel modification additive dissolved in the monomer). In this regard, we have surprisingly also found that adding the gel modification additive and lowering the temperature will allow the catalytic activity of the catalyst to be inhibited for extended periods of time (days or longer) and that the catalyst can then be "reactivated" by heating. Further, the addition of the gel modification additives according to the present invention have an unexpected desirable effect on the properties of the resulting polymers. For example, when triphenylphosphine was used as the gel modification additive, the heat distortion temperature (HDT) of the resulting DCPD part was significantly higher and the surface appearance of the resulting part was improved when compared to parts produced in the absence of a gel modification additive. We therefore deduce that a polyDCPD material that includes the gel modification additive of the present invention can have superior material properties compared to the material produced without any gel modification additive present.

Experimental
Synthesis of Ruthenium Complex Catalyst $Cl_2Ru(PCy_3)_2$ (=CHCH=CPh$_2$).

A Ruthenium complex catalyst of the present invention may be prepared in a one step synthesis as illustrated in the reaction sequence below.

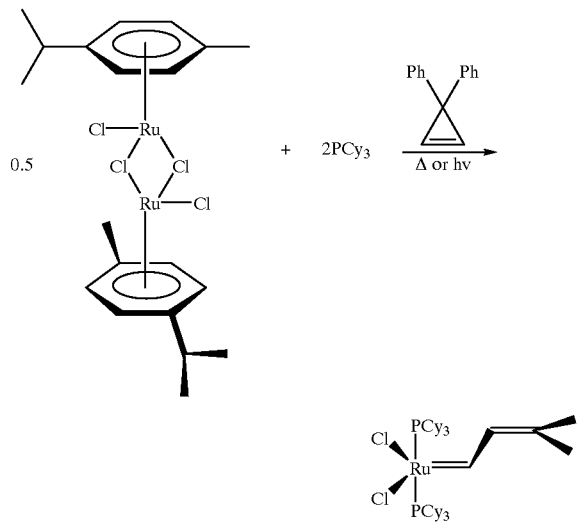

In a typical reaction, [(Cymene)RuCl$_2$]$_2$ dimer complex (0.53 g, 1.73 mmol Ru) and PCy$_3$ (0.91 g, 2 equiv) were loaded under inert atmosphere into a 100 mL Schlenk flask equipped with a magnetic stirbar. Benzene (40 mL) was then added followed by 3,3-diphenylcyclopropene (0.33 g, 1 equiv). The reaction flask was then attached to a reflux condenser under an inert atmosphere and heated in an oilbath at 83–85° C. for 6 hours. The solvent was then removed to complete dryness in vacuo and the remaining red solid washed with pentane (4×25 mL) under inert atmosphere. The remaining red powder was dried under vacuum for 12 h and stored under an inert atmosphere yielding 1.4 g of $Cl_2Ru(PCy_3)_2$(=CHCH=CPh$_2$) in 88% yield.

Purification and Degassing of DCPD Monomer 500 mL DCPD was filtered under vacuum into a one liter round bottom flask through a 150 mL medium porosity sintered glass fritted funnel containing one inch of aluminum oxide. Lower grades of DCPD with lower freezing points can be used after similar purifying treatment.

To the round bottom flask, containing purified DCPD as above, was added a 1-inch magnetic stir bar. The flask was placed in a water bath 30– 35° C. and under 0.10 mm Hg vacuum with stirring for from 20 minutes to 1 hour. The degassed DCPD was then stored under vacuum and protected from light to prevent premature free radical polymerization.

We have found that due to the functional group tolerance of the catalysts of the present invention, we do not need to purify and degass the DCPD monomer before carrying out the polymerization.

DCPD Polymerization Without Gel Modification Additive using P(CyPentyl)$_3$)$_2$Cl$_2$Ru(=CHCH=CPh$_2$) catalyst To a 250 mL Erlenmeyer flask containing a 1-inch magnetic stir bar, DCPD, purified and degassed, as described above, (147.9 g, 150 mL, 1.12 mol, 5000 eq) and (P(CyPentyl)$_3$)$_2$Cl$_2$Ru(=CHCH=CPh$_2$) (188.5 mg, 0.224 mmol, 1 eq) were added. Stirring was initiated and optionally a slow flow of argon was introduced into the flask. The orange solution was stirred at room temperature for 8 minutes under argon until it became highly viscous. The solution was then poured open to air into a crystallization dish (14.6 cm in diameter) that had been previously stored at 120° C. After 2 minutes, the solution began to gel, and the production of smoke was observed over the following 2 minutes. At this point, the polymerization appeared complete, and the crystallization dish cooled to room temperature. The polymer separated from the sides of the crystallization dish easily. The polymer was post-cured at 120° C. for 3 hours, resulting in poly(DCPD) (141.1 g, 95.4% yield).

DCPD Polymerization with Gel Modification Additive using P(CyPentyl)$_3$)$_2$)Cl$_2$Ru(=CHCH=CPh$_2$) catalyst.

To a flask containing a stir bar, triphenylphosphine (95 mg), and DCPD, purified and degassed, as described above, (63.991 g) were added. The flask was stirred under vacuum for about 5 minutes. (P(CyPentyl)$_3$)$_2$Cl$_2$Ru (=CHCH=CPh$_2$) (71 mg) was then added to the mixture and a slow flow of argon was introduced into the flask. The solution was then stirred at room temperature under argon. After 59 minutes, the acetone test (See below) gave a "Flat Ball" result. The solution was then poured open to air into a mold that had been previously stored at 60.2° C. The peak temperature of the reaction occurred about 10 minutes after pouring, with a peak temperature of about 158° C.

Acetone Test

The acetone test was a subjective test used to measure the extent of the polymerization reaction. In this test, a few drops of the catalyzed DCPD were removed with a small pipet and dropped into a test tube of acetone. Visual inspection yielded a qualitative measure of the extent of polymer formation. The visual results were described as "Nothing" (no polymerization), "Cloud", "Flat Ball" (some polymerization), and "Ball."

Dependence of Pot Life on Concentration of Gel Modification Additive Using P(CyPentyl)$_3$)$_2$Cl$_2$Ru(=CHCH=CPh) catalyst: TABLE 3

203 mg of triphenylphosphine was added to 4.052 g of 95% DCPD in a test tube and the test tube shaken until the triphenylphosphine was dissolved. 74 mg of (P(CyPentyl)$_3$)$_2$Cl$_2$Ru(=CHCH=CPh$_2$) was then added, shaken by hand and then mixed with a stir bar for about 1–2 minutes. The mixture was then set aside. After 3 hours 20 minutes, the mixture was still fluid, i.e. only partial polymerization had occurred. The pot life of this reaction mixture is therefore greater than 3 hours 20 minutes. The reaction mixture was added to 60.06 g of DCPD. The mixture was stirred slowly under vacuum (this is optional) for a further 5 minutes and then poured into a mold that had been preheated to 60.8° C. The peak exotherm occurred after about 19 minutes at a temperature of about 69.5° C. The mold was then allowed to cool to room temperature and the polymer removed from the mold and post cured at 190° C. for 1 hour.

The experimental procedure described above was carried out for different concentrations of the gel modification additive and the results are summarized in Table 3.

TABLE 3

| Sample | Monomer/Catalyst | PPh$_3$ (g) | Catalyst (g) | Pot Life+ | Peak Exotherm time (min) |
|---|---|---|---|---|---|
| 1 | 5000:1 | .203 | .074 | >3hr 20 min | 19 |
| 2 | 5000:1 | .079 | .071 | 2 hr 14 min | ~6 |
| 3 | 5000:1 | .044 | .071 | 49 min | ~4½ |

+The pot life for samples 2 and 3 is the time at which the polymerization mixture is becoming viscous but can still be poured.

Dependence of Gel Time on Concentration of Gel Modification Additive: Table 4
Using Catalyst (P(CyHexl)$_3$)$_2$ Cl$_2$RuCHPh The following reactions were carried out using a catalyst of the formula (P(CyHexyl)$_3$)$_2$ Cl$_2$RuCHPh the results of which are summarized in Table 4. The sample numbers relate to the entries in Table 4.

Sample #4
Pour into a 250 ml flask with stir bar approximately 64.6 g of Velsicol VHP DCPD that has been filtered and degassed with vacuum. (Note: filtering and degassing are optional). Add 0.054 g of catalyst (P(CyHexyl)$_3$)$_2$ Cl$_2$RuCHPh and stir for about 3 minutes. Pour into mold. Mold temperature was 34.4° C. and the DCPD monomer temperature 31.5° C. Gel time was <2 minutes & 45 seconds with peak exotherm at 4 minutes & 11 seconds and a peak temperature of 133.8° C.

Note: Gel time is defined as a) the time at which a stir bar ceases turning in a 250-ml flask during mixing of the catalyst/monomer; or b) the time at which a glass pipet lowered or pushed into a very high viscosity poured sample will no longer pick up or have "cling to" the pipet any of the polymerizing sample.

Sample #5
Pour into a 250-ml flask with stir bar approximately 64.0 g of Velsicol VHP DCPD that has been filtered and degassed with vacuum. (Note: filtering and degassing are optional). Add 0.030 g of triphenylphosphine and mix for about 5 minutes. Add 0.054 g of catalyst (P(CyHexyl)$_3$)$_2$ Cl$_2$RuCHPh and stir for about 3 minutes. Pour into mold. Mold temperature was 35.0° C. and the DCPD monomer temperature 31.5° C.

Sample #6
Pour into a 250-ml flask with stir bar approximately 64.0 g of Velsicol VHP DCPD that has been filtered and degassed with vacuum. (Note: filtering and degassing are optional). Add 0.065 g of triphenylphosphine and mix for about 5 minutes. Add 0.054 g of catalyst (P(CyHexyl)$_3$)$_2$ Cl$_2$RuCHPh and stir for about 3 minutes. Pour into mold. Mold temperature was 37.8° C. and the DCPD monomer temperature 33° C.

Sample #7
Pour into a 250-ml flask with stir bar approximately 64.0 g of Velsicol VHP DCPD that has been filtered and degassed with vacuum. (Note: filtering and degassing are optional). Add 0. 200 g of triphenylphosphine and mix for about 5 minutes. Add 0.054 g of catalyst (P(CyHexyl)$_3$)$_2$ Cl$_2$RuCHPh and stir for about 3 minutes. Pour into mold. Mold temperature was 36.3° C. and the DCPD monomer temperature 31° C.

Sample #8
In a 25×150 mm test tube, add approximately 8.132 g of Velsicol VHP DCPD that has been filtered and degassed with vacuum. (Note: filtering and degassing are optional). Add 0.060 g of triphenylphosphine and mix until dissolved—about 3–5 minutes. Add 0.054 g of catalyst (P(CyHexyl)$_3$)$_2$ Cl$_2$RuCHPh and stir for about 3 minutes. Then put test tube into a dry ice/acetone bath for approximately 30 seconds to cool, and then put sample into a 35° F. refrigeration and leave overnight.

The following day, weigh out about 56 g of Velsicol VHP that has been filtered and degassed with vacuum. (Note: filtering and degassing are optional). Add the frozen Catalyst/TPP/DCPD concentrate pellet to the 56 g of DCPD monomer and mix until dissolved—about 49 seconds. Resin temperature is 35° C. Mix for 3 minutes longer and pour into a 33.8° C. mold. Resin temperature at pour=35.4° C.

Sample #9
In a 250-ml flask with stir bar add approximately 64.0 g of Lyondell 108 94.04% DCPD that has been filtered and degassed with vacuum. Add 0.055 g of Triphenylphosphine and mix for about 5 minutes. Add 0.054 g of catalyst (P(CyHexyl)$_3$)$_2$ Cl$_2$RuCHPh and mix for about 3 minutes. Pour into mold. Mold temperature is 38° C. and the DCPD monomer temperature 32° C.

Sample #10
In a 250-ml flask with stir bar add approximately 64.0 g of Lyondell 108 94.04% DCPD that has been filtered and degassed with vacuum. Add 0.054 g of catalyst (P(CyHexyl)$_3$)$_2$ Cl$_2$RuCHPh and mix for 3 minutes. Pour into mold. Mold temperature is 38° C. and the DCPD monomer temperature 32° C.

Sample #11
Pour into a 250-ml flask with stir bar approximately 64.1 g of Velsicol VHP DCPD that has been filtered and degassed with vacuum. (Note: filtering and degassing is optional). Add 0.200 g of triphenylphosphine and mix for about 5 minutes. Add 0.080 g of catalyst (P(CyHexyl)$_3$)$_2$ Cl$_2$RuCHPh and stir for about 3 minutes. Pour into mold. Mold temperature was 32° C. and the DCPD monomer temperature 33° C.

Sample #12
In a 25×150 mm test tube, add approximately 6.0 g of Velsicol VHP DCPD that has been filtered and degassed with vacuum. (Note: filtering and degassing are optional). Add 0.11 g of triphenylphosphine and mix until dissolved—about 3–5 minutes. Add 0.054 g of catalyst (P(CyHexyl)$_3$)$_2$Cl$_2$RuCHPh and stir for about 3 minutes. Put 58 g of Velsicol VHP DCPD into a flask and mix in test tube with Catalyst/Monomer/TPP mix for one minute. Pour into mold. Mold temperature is 37.9° C. Resin temperature about 31.8° C.

Dependence of Gel Time on Gel Modification Additive: Table 5

The following experiments use a similar format to those set forth in Table 4, but the gel modification additive was varied. The results of these experiments are summarized in Table 5. These experiments used two different catalysts: $(P(CyHexyl)_3)_2$ $Cl_2RuCHPh$ and $(PPh_3)_2$ $Cl_2Ru$ $(=CHCH=CMe_2)$. Other than for the five specific experiments described below (Sample #s 29–33), all results presented in Table 5 are for the $(P(CyHexyl)_3)_2$ $Cl_2RuCHPh$ catalyst. The sample numbers relate to the entries in Table 5.
Using Catalyst $(P(CyHexyl)_3)_2Cl_2RuCHPh$: Sample #s 13–28

In a 250-mL flask approximately 64.0 g of filtered and degassed Velsicol VHP DCPD was added. The gel modification additive was added. After mixing until dissolved or 5 minutes, the catalyst $(P(CyHexyl)_3)_2Cl_2RuCHPh$ was added. After mixing for about 3 minutes (or less if gelation had occurred) the mixture was poured into a mold.
Using Catalyst $(PPh_3)_2$ $Cl_2Ru(=CHCH=CMe_2)$: Sample #s 29–33

The following reactions were carried out using the $(PPh_3)_2Cl_2Ru(=CHCH=CMe_2)$ catalyst.
Sample 29

Pour into a 250-ml flask with stir bar approximately 64.0 g of Velsicol VHP DCPD that has been filtered and degassed with vacuum. (Note: filtering and degassing are optional). Add 0.020 g of tricyclohexylphosphine and mix for about 5 minutes. Add 0.049 g of catalyst $(PPh_3)_2Cl_2Ru$ $(=CHCH=CMe_2)$ and mix for 3 minutes. Pour into mold. Mold temperature was 39.2° C. and the Resin temperature 33.6° C.
Sample 30

Pour into a 250-ml flask with stir bar approximately 64.0 g of Velsicol VHP DCPD that has been filtered and degassed with vacuum. (Note: filtering and degassing are optional). Add 0.054 g of tricyclohexylphosphine and mix for about 5 minutes. Add 0.049 g of catalyst $(PPh_3)_2Cl_2Ru$ $(=CHCH=CMe_2)$ and mix for 3 minutes. Pour into mold. Mold temperature was 37.5° C. and the resin temperature 32.0° C.
Sample #31

Pour into a 250-ml flask with stir bar approximately 64.0 g of Velsicol VHP DCPD that has been filtered and degassed with vacuum. (Note: filtering and degassing are optional). Add 0.032 g of tricyclohexylphosphine and mix for about 5 minutes. Add 0.049 g of catalyst $(PPh_3)_2Cl_2Ru$ $(=CHCH=CMe_2)$ and mix for 3 minutes. Pour into mold. Mold temperature was 39.3° C. and the resin temperature 32.0° C.
Sample 32

Pour into a 250-ml flask with stir bar approximately 64.0 g of Velsicol VHP DCPD that has been filtered and degassed with vacuum. (Note: filtering and degassing are optional). Add 0.049 g of catalyst $(PPh_3)_2Cl_2Ru(=CHCH=CMe2)$ and mix for 3 minutes. Pour into mold. Mold temperature was 40.6° C. and the Resin temperature 34.0° C.
Sample #33

In a 25×150 mm test tube, add 0.051 g of catalyst $(PPh_3)_2Cl_2Ru(=CHCH=CMe_2)$ and 4–6 g of dichloromethane. Add stir bar and mix for about 5 minutes or until catalyst appears to dissolve. Then add 0.052 g tricyclohexylphosphine and purge test tube with argon. Cap test tube and mix at room temperature for 2 hours. After 2 hours, pull off dichloromethane with a vacuum and wash catalyst mixture with another dichloromethane wash. Now add approximately 10.0 g of Velsicol VHP DCPD that has not been filtered or degassed, to the test tube and mix rapidly for about 1 minute or until the catalyst mixture is dissolved in the DCPD. Add the DCPD/catalyst mixture to a flask containing 54.0 g of Velsicol VHP DCPD that has not been filtered or degassed. Continue mixing for about 3 minutes total mix time. Pour into mold. Mold temperature was 38.3° C. and the resin temperature 32.0° C.

TABLE 4

Triphenylphosphine Level vs. Gel Time

| Sample # | Monomer/ Catalyst | Weight DCPD (g) | PPh$_3$ (g) | Catalyst (g) | Mold Temp. ° C. | Resin Temp. ° C. | Gel Time (min) | Peak Exotherm Time (min) | Peak Exotherm Temp. ° C. | Part Cure Schedule | 264 psi HDT ° C. |
|---|---|---|---|---|---|---|---|---|---|---|---|
| 4 | 7500:1 | 64.6 | 0 | .054 | 34.4 | 31.5 | <2.75 | 4.18 | 133.8 | a | 59 |
| 5 | 7500:1 | 64.0 | .030 | .054 | 35.0 | 31.5 | 11.00 | 16.28 | 143.6 | a | 122.5 |
| 6 | 7500:1 | 64.0 | .065 | .054 | 37.8 | 33.0 | 25.00 | 27.00 | 42.0 | a | 126.5 |
| 7 | 7500:1 | 64.0 | .200 | .054 | 36.3 | 31.0 | >99.00 | 53.00 | 37.6 | a | 69 |
| 8 | 7500:1 | 64.0 | .060 | .054 | 33.8 | 35.4 | 16.00 | 17.00 | 38.2 | a | 130 |
| 9 | 7500:1 | 64.0 | .055 | .054 | 38.0 | 32.0 | >109.00 | — | — | a | 114 |
| 10 | 7500:1 | 64 g | 0 | .054 | 38.0 | 32.0 | <7.00 | 18.58 | 68.3 | a | 109 |
| 11 | 5000:1 | 64.1 g | .200 | .080 | 32.0 | 33.0 | >154.00 | — | — | a | 128 |
| 12 | 7500:1 | 64.0 | .011 | .054 | 37.9 | 31.8 | <4.00 | 9.56 | 161.1 | — | — |

Cure Schedule
a: 1 hour and 15 minutes @ 130° C.

TABLE 5

Gel Modification Additives vs. Gel Time

| Sample # | Weight of Catalyst (g) | Weight of DCPD (g) | Gel* Modification Additive | Additive Amount | Mold Temp ° C. | Resin Temp ° C. | Gel Time (min) | Peak Exotherm Time (min) | Peak Exotherm Temp. ° C. |
|---|---|---|---|---|---|---|---|---|---|
| 13 | .054 | 64.0 | #1 | .010 g | 36.4 | 31.0 | 6.00 | 7.33 | 160.3 |
| 14 | .054 | 64.0 | #1 | .028 g | 36.2 | 31.0 | 9.00 | 10.83 | 173.2 |
| 15 | .054 | 64.0 | #1 | .073 g | 36.3 | 31.0 | 21.00 | 38.30 | 91.5 |
| 16 | .054 | 64.1 | #2 | .069 g | 38.6 | 33.3 | 6.00 | 7.20 | 190.4 |
| 17 | .054 | 64.0 | #2 | .150 g | 36.3 | 33.2 | 11.00 | 13.75 | 184.9 |
| 18 | .054 | 64.0 | #3 | .084 g | 35.9 | 32.5 | none | none | none |
| 19 | .054 | 64.0 | #4 | .061 g | 37.1 | 31.0 | 10.00 | 15.10 | 145.1 |
| 20 | .054 | 64.0 | #5 | .046 g | 36.6 | 32.0 | none | none | none |
| 21 | .054 | 64.6 | #6 | .062 g | 35.0 | 31.0 | none | none | none |
| 22 | .056 | 64.0 | #7 | .066 g | 33.1 | 32.0 | 1.50 | too fast to measure | |
| 23 | .054 | 64.0 | #7 | .150 g | 33.0 | 32.0 | ≈2.50 | 4.03 | 148.4 |
| 24 | .054 | 64.3 | #8 | .062 g | 34.0 | 32.0 | 1.50 | too fast to measure | |
| 25 | .054 | 64.0 | #8 | .290 g | ≈35.0 | 32.0 | 2.75 | — | — |
| 26 | .054 | 64.0 | #9 | .150 ml | 35.6 | 32.0 | 1.23 | too fast to measure | |
| 27 | .054 | 64.0 | #10 | .150 ml | 33.9 | 32.0 | 1.88 | too fast to measure | |
| 28 | .054 | 64.0 | #11 | .150 ml | 33.6 | 32.0 | 1.32 | too fast to measure | |
| 29 | .049 | 64.0 | #2 | .020 g | 39.2 | 33.6 | 9.00 | 15.00 | 44.2 |
| 30 | .049 | 64.0 | #2 | .054 g | 37.5 | 32.0 | 12.00 | 21.00 | 48.00 |
| 31 | .049 | 64.0 | #1 | .032 g | 39.3 | 32.0 | >16.00 | 14.00 | 14.00 |
| 32 | .049 | 64.0 | none | none | 40.6 | 34.0 | >60.0 | — | — |
| 33 | .051 | 64.0 | #2 | .052 g | 38.3 | 32.0 | 13.00 | 20.75 | 111.7 |

Gel Modification Additives
*#1 Tricyclopentylphosphine
*#2 Tricyclohexylphosphine
*#3 Triphenylphosphite
*#4 Pyridine
*#5 Propylamine
*#6 Tributylphosphine
*#7 Benzonitrile
*#8 Triphenylarsine
*#9 Anhydrous Acetonitrile
*#10 Thiophene
*#11 Furan The results for samples 4–7 (Table 5) demonstrate that when using a $(P(CyHexyl)_3)_2 Cl_2RuCHPh$ catalyst, increasing the concentration of the gel modification additive $PPh_3$ increases the gel time (i.e., decreases the reaction rate). This is as expected: the catalyst used in samples 4–7 includes trihexylphosphine L and $L^1$ ligands and since exchanging these ligands for $PPh_3$ yields a less active catalyst, the added $PPh_3$ may only act to retard the reaction. These results also show that polymer articles molded with DCPD containing a gel modification additive possess superior heat deflection temperature properties as compared with an article molded with DCPD that does not contain a gel modification additive. The gel time, peak exotherm characteristics, and HDT test results are very similar for samples 8 and 6 (Table 5). Since these samples were prepared by similar methods except that in sample 8 a catalyst/gel modification additive/monomer concentrate was prepared and frozen overnight, this demonstrates that the catalyst may be inhibited for long periods of time and then be "reactivated" by heating.

The results for samples 13–15 (Table 5) demonstrate that when using a $(P(CyHexyl)_3)_2 Cl_2RuCHPh$ catalyst, increasing the concentration of the gel modification additive $P(cyclopentyl)_3$ increases the gel time (i.e., decreases the reaction rate). This demonstrates that the gel modification additive may decrease the reaction rate by competing with the monomer for the open coordination site.

The results for samples 16 and 17 (Table 5) further demonstrate that increasing the concentration of the gel modification additive increases the gel time (i.e., decreases the reaction rate). In this case, the gel modification additive is the same as the L and $L^1$ ligands (both tricyclohexylphosphine). Since the gel modification additive and the L and $L^1$ ligands are the same, ligand exchange cannot effect the rate of reaction and we expect the additive to retard the reaction by competing with the monomer for the open coordination site.

Finally, the results for samples 29–33 (Table 5) demonstrate that when using a $(PPh_3)_2Cl_2Ru(=CHCH=CMe_2)$ catalyst, adding either $P(cyclopentyl)_3$ or $P(cyclohexyl)_3$ as a gel modification additive decreases the gel time (i.e., increases the reaction rate) compared to the gel time for the reaction with no additive (sample 32). This result is as expected since the catalyst with $P(cyclopentyl)_3$ or $P(cyclohexyl)_3$ L and $L^1$ ligands is more active than that with $PPh_3$ ligands.

We claim:

1. A composition of matter, comprising:
    (a) a ruthenium or osmium carbene complex catalyst having a ruthenium or osmium metal center that is in a +2 oxidation state an electron count of 16, and is pentacoordinated;
    (b) a functionalized or unfunctionalized olefin capable of polymerization by said catalyst;
    (c) an electron donor or Lewis base in a concentration sufficient to change the rate of an olefin metathesis catalyzed by said carbene complex catalyst in the absence of said electron donor or Lewis base; and
    (d) an additive for enhancing at least one bulk property of said composition of matter without interfering with the polymerization of said olefin by said catalyst.

2. A composition of matter according to claim 1, wherein said additive is inorganic, organic or metallic.

3. A composition of matter according to claim 2 wherein said inorganic additive is a member selected from the group consisting of minerals, glass, talc, barium, calcium carbonate, calcium sulfate, clay, hydrated alumina, mica, perlite, quartz, wollastonite, and silica.

4. A composition of matter according to claim 2, wherein said organic additive is a member selected from the group consisting of carbon, cotton, wool, polyvinyl, polyvinylidene chloride, a phenolic, polyacrylonitrile, cork, α-cellulose, a thermoplastic and an elastomer-toughened monomer.

5. A composition of matter according to claim 2, wherein said metallic additive is a member selected from the group consisting of silver, gold, aluminum, tin and copper.

6. A composition of matter according to claim 1 wherein said additive is a fiber or reinforcement.

7. A composition of matter according to claim 6 wherein said additive is selected from the group consisting of minerals, glass, and carbon.

8. A composition of matter according to claim 6 wherein said additive is selected from the group consisting of mica, mats, yarns, fabrics, woven rovings, and continuous strands.

9. A composition of matter according to claim 1 wherein component (c) is a neutral electron donor or neutral Lewis base.

10. A composition of matter according to claim 1 wherein component (c) is selected from the group consisting of phosphines, sulfonated phosphines, phosphites, phosphinites, phosphonites, arsines, stibines, ethers, amines, amnides, sulfoxides, carboxyls, nitrosyls, pyridines, thioethers, nitriles, thiophenes, and furans.

11. A composition of matter according to claim 10 wherein component (c) is a trialkyl or triaryl phosphine.

12. A composition of matter according to claim 1 wherein component (c) is selected form the group consisting of $P(cyclohexyl)_3$, $P(cyclopentyl)_3$, $P(isopropyl)_3$, and pyridine.

13. A composition of matter according to claim 1 wherein component (c) is $P(phenyl)_3$.

14. A composition of matter according to claim 1 wherein component (c) is selected from the group consisting of tricyclopentylphosphine, tricyclohexylphosphine, triphenylphosphite, pyridine, propylamine, tributylphosphine, benzonitrile, triphenylarsine, anhydrous acetonitrile, thiophene, and furan.

15. A composition of matter according to claim 1 wherein component (c) contains one or more functional groups selected from the group consisting of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

16. A composition of matter, comprising:
(a) a catalyst of the formula:

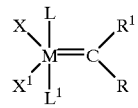

wherein:
M is ruthenium or osmium;
X and $X^1$ are either the same or different and are any anionic ligand;
L and $L^1$ are either the same or different and are any neutral electron donor; and R and $R^1$ are either the same or different and are each independently hydrogen or a substitutent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted;

(b) a functionalized or unfunctionalized olefin selected from the group consisting of dicyclopentadiene, norbornene, cyclobutene, cyclopentene, cycloheptene, cyclooctene, cyclononene, cyclodecene, cyclooctadiene, cyclononadiene, cyclododecene, 7-oxanorbornene, norbornadiene, and 7-oxanorbornadiene;

(c) an electron donor or Lewis base in a concentration sufficient to change the rate of an olefin metathesis catalyzed by said catalyst in the absence of said electron donor or Lewis base; and (d) an additive for enhancing at least one bulk property of said composition of matter without interfering with the polymerization of said olefin by said catalyst, wherein the additive is selected from the group consisting of organic fillers, inorganic fillers, metallic fillers, fibers and reinforcements.

17. A composition of matter according to claim 16 wherein the olefin is dicyclopentadiene.

18. A composition of matter according to claim 16 wherein component (c) is selected from the group consisting of phosphines, sulfonated phosphines, phosphites, phosphinites, phosphonites, arsines, stibines, ethers, amines, amides, sulfoxides, carboxyls, nitrosyls, pyridines, thioethers, nitriles, thiophenes, and furans.

19. A composition of matter, comprising:
(a) a catalyst of the formula:

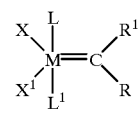

wherein:
M is ruthenium;
X and $X^1$ are both Cl;
L and $L^1$ are triphenylphosphines or tricycloalkylphosphines;
R is selected from the group consisting of substituted aryl, unsubstituted aryl, substituted vinyl, or unsubstituted vinyl; and $R^1$ is hydrogen;

(b) functionalized or unfunctionalized olefin selected from the group consisting of dicyclopentadiene, norbornene, cyclobutene, cyclopentene, cycloheptene, cyclooctene, cyclononene, cyclodecene, cyclooctadiene, cyclononadiene, cyclododecene, 7-oxanorbornene, norbornadiene, and 7-oxanorbornadiene;

(c) a member selected from the group consisting of phosphines, sulfonated phosphines, phosphites, phosphinites, phosphonites, arsines, stibines, ethers, amines, amides, sulfoxides, carboxyls, nitrosyls, pyridines, thioethers, nitriles, thiophenes, and furans; and (d) an additive for enhancing at least one bulk property of said composition of matter without interfering with the polymerization of said olefin by said catalyst, wherein the additive is selected from the group consisting of organic fillers, inorganic fillers, metallic fillers, fibers and reinforcements.

20. A composition of matter according to claim 19 wherein the additive is carbon fibers.

* * * * *